3,846,270
Patented Nov. 5, 1974

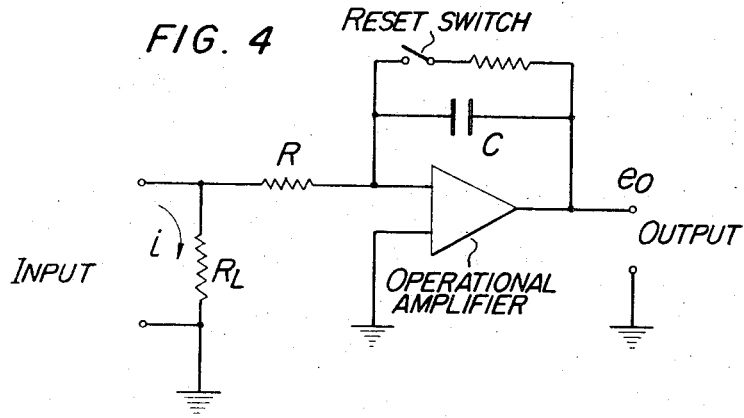
FIG. 4
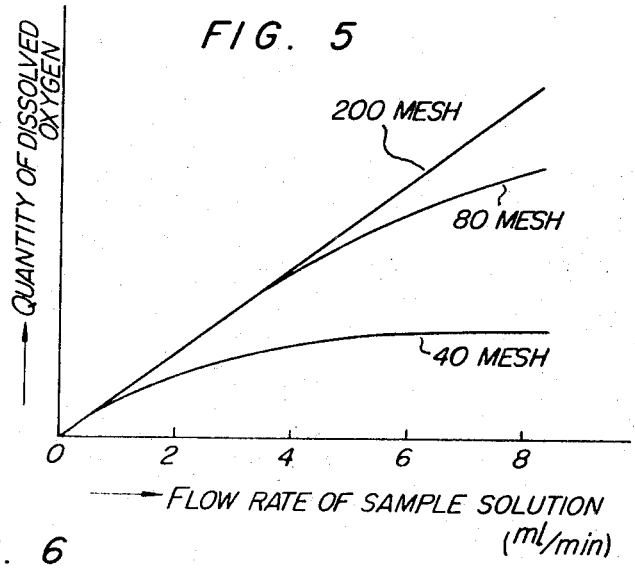
FIG. 5
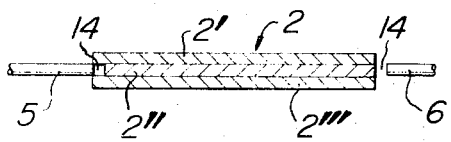
FIG. 6
FIG. 7
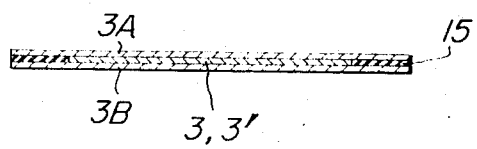
FIG. 8

3,846,270
DETECTOR CELL FOR COULOMETRIC ANALYSIS
Giichi Muto, Tokyo, Yoshinori Takata, Hitachi, and Yoshimasa Hamano, Katsuta, Japan, assignors to Hitachi, Ltd., Tokyo, Japan
Continuation of abandoned application Ser. No. 37,677, May 15, 1970. This application Oct. 30, 1972, Ser. No. 301,735
Claims priority, application Japan, May 16, 1969, 44/37,393
Int. Cl. G01n 27/28, 27/42
U.S. Cl. 204—195 T
11 Claims

ABSTRACT OF THE DISCLOSURE

A detector cell for coulometric analysis in which a working electrode and counterelectrodes each disposed on each side of the working electrode with a diaphragm interposed therebetween are accommodated in a vessel which is filled with an electrolyte solution and is provided with sample inlet and outlet. While a sample to be analyzed is being led from the sample inlet through the working electrode to the sample outlet, an object material in the sample is electrolyzed.

CROSS-REFERENCE TO THE RELATED APPLICATION

This application is a continuation application of U.S. application Ser. No. 37,677 filed on May 15, 1970, now abandoned.

The present invention relates to a detector cell for coulometric analysis, and more particularly to a detector cell for coulometric analysis suitable for detecting components separated by liquid chromatograph.

When a required voltage is applied between an anode and a cathode immersed in an electrolyte solution reduction takes place at the cathode, while oxidation takes place at the anode.

Although it is believed that there remain many problems yet to be solved as regards the reaction mechanism at the electrode, according to one reliable theory the reaction at the electrode occurs, assuming that the electrode is covered with a very thin diffusion layer of a low concentration, through the following three stages of processes:

(1) The material in the solution moves into the diffusion layer from the outside thereof by convection and migration.
(2) The material in the diffusion layer moves to the electrode through diffusion and cataphoresis.
(3) At the surface of the electrode the transfer of electrons occurs.

According to the Fick's law there is the following relation between the number of moles $dN$ pertaining to the reaction during the infinitesimal time interval $dt$ and the concentration gradient $dc/dx$ at the surface of the electrode:

$$\frac{dN}{dt} = -DA\left(\frac{dc}{dx}\right) \qquad (1)$$

where D is the diffusion coefficient of the reacting material and A is the area of the electrode.

An instantaneous current $i_t$ during the reaction is expressed by $$i_t = -nF\left(\frac{dN}{dt}\right) \qquad (2)$$

where $n$ is the number of electrons and F is the quantity of electricity expressed in Faraday.

Assume that the concentration of the diffusion layer is proportional to the distance $x$ from the surface of the electrode, then $dc/dx = (C_o - c)/\delta$, where $C_c$ is the concentration at the surface of the electrode and $\delta$ is the thickness of the diffusion layer. If the electrolysis progresses rapidly, $dc/dx = C/\delta$ stands because the concentration at the surface of the electrode can be neglected. Consequently, there results $$i_t = nFDAc/\delta \qquad (3)$$

If the total volume of the solution is expressed by V, then $N = CV$ stands, and hence $$i_t = -nFV\left(\frac{dc}{dt}\right)$$

from Equation (2). Thus, the rate of decrease in the concentration is $$\left(\frac{dc}{dt}\right) = -\frac{DAc}{V\delta} \qquad (4)$$

Integrating Equation (4) with respect to time from 0 to $t$ $$C_t = C_o \exp(-DAt/V\delta) \equiv C_o \exp(-Kt) \qquad (5)$$

where $K = DA/V\delta$.

From Equations (3) and (5)

$$i_t = i_o \exp(-Kt) \qquad (6)$$

where $i_o$ is the initial current at time zero.

Coulometry is an analysis of material which includes the measurement of the number of electrons, i.e. the quantity of electricity and the utilization of the Faraday's law of electrolysis.

The quantity of electricity Q participated in a reaction is expressed as follows as a function of the weight W of an object material $$Q = \frac{nFW}{M} = \int i\, dt \qquad (7)$$

where M is the molecular weight of the object material.
When the object material is in the flow of the solution, $$i = \frac{dQ}{dt} = nFvc \qquad (8)$$

where $v$ is the velocity of the flowing solution.

There are two kinds of coulometry, that is, constant current coulometry and controlled potential coulometry.

When applying coulometry to liquid chromatograph, controlled potential coulometry is superior to constant current coulometry because instantaneous electrolysis of material is required. When the controlled potential coulometry is applied to liquid chromatograph, generally the following advantages are expected:

(1) The sensitivity is very high. Consequently, it is possible to detect a material of a very low concentration.
(2) So far as the current efficiency is 100%, the preparation of a calibration curve is unnecessary, and hence the absolute quantitative analysis of material can be accomplished.
(3) Since material can be instantaneously electrolyzed, the controlled potential coulometry is very suitable for detecting each component separated by liquid chromatograph.
(4) Even such material as is not separated by liquid chromatograph can be quantitatively analyzed by varying the electrode potential.
(5) By introducing secondary controlled potential coulometry even electroinactive substance can be detected, and hence a wide range of and almost all materials can be detected.
(6) The variation in the flow rate and temperature of an eluting solution hardly affects the results of analysis.

As a method of detecting each component separated by liquid chromatograph there are known a light absorption method, a refractive index measuring method, a fluorescence measuring method, an electric conductivity measuring method, a radioactivity measuring method, polarography, etc. Since none of these methods simultaneously has the above-mentioned advantages of controlled potential coulometry, recently attention has been drawn to the controlled potential coulometry as a method of detecting the components separated by liquid chromatograph.

The crux of the coulometric analysis is a coulometric cell or electrolytic cell. When the coulometric cell is employed for detecting each component separated by liquid chromatograph, it is essential for the cell to meet the following requirements:

(1) When the resistance of the cell is represented by R and the current (electrolytic current) flowing through the resistor R is represented by I, the potential drop IR should be negligibly small, that is, the resistance R should be very low.
(2) The electrolytic velocity should be high and the response should be rapid. For these purposes, as is evident from Equations (4) and (5), the volume of the cell should be small and the surface area of the electrode should be as large as possible.
(3) The potential of the working electrode in the cell should be stable and the potential distribution should be uniform.
(4) The quantity of the sample should be small.
(5) The structure thereof should be such that electrical noise is small.
(6) The structure thereof should be simple.
(7) The structure of the counterelectrode should be such that the polarization at the counterelectrode is negligibly small even when a current is flowing.

Some examples of the application of controlled potential coulometry to liquid chromatograph have been practically known. However, none necessarily meets the above-mentioned requirements.

An object of the present invention is to provide a detector cell for coulometric analysis in which the volume of the cell is small, the surface area of the electrode is large, and the distribution of the potential in the cell is uniform.

Another object of the present invention is to provide a detector cell for coulometric analysis having a very low cell resistance.

A further object of the present invention is to provide a detector cell for coulometric analysis which hardly generates electric noise.

According to an aspect of the present invention there is provided a detector cell for coulometric analysis comprising a vessel filled with an electrolyte solution, a flat working electrode arranged in said vessel, counterelectrodes each disposed in said vessel on each side of said working electrode with a diaphragm interposed therebetween, and sample inlet and outlet provided to said vessel for leading a sample to be analyzed to and away from said working electrode.

According to another aspect of the present invention there is provided a detector cell for coulometric analysis comprising a vessel, a working electrode disposed in said vessel, counterelectrodes disposed in said vessel on each side of said working electrode with a diaphragm interposed therebetween, electrolyte solution inlet and outlet provided to said vessel for passing an electrolyte solution through said counterelectrodes, and sample inlet and outlet provided to said vessel for leading a sample to be analyzed to and away from said working electrode.

According to a further aspect of the present invention there is provided a detector cell for coulometric analysis comprising a flat working electrode, diaphragm assemblies disposed on each side of said working electrode, each of said diaphragm assemblies comprising an ion-exchange membrane and cloth disposed on both sides thereof, said ion-exchange membrane and said cloth being integrated into a unit by silicone rubber impregnated into said cloth at the periphery thereof, counterelectrodes disposed on the side of each of said diaphragm assemblies opposite to said working electrode, a vessel accommodating the above-mentioned members, electrolyte solution inlet and outlet provided to said vessel for passing an electrolyte solution through said counterelectrodes, and sample inlet and outlet provided to said vessel in such a manner that spaces are provided between said working electrode and said inlet and outlet, respectively, for leading a sample to be analyzed to and away from said working electrode.

The objects and advantages of the present invention will become more apparent from the following detailed description of the preferred embodiments of this invention when taken in conjunction with the accompanying drawings, in which:

FIG. 4 is a circuit diagram of a coulometer for use with a detector cell for coulometric analysis according to this invention;

FIG. 5 is a graph showing the relation between the flow rate of a specimen and the detected quantity of dissolved oxygen;

FIG. 6 is a cross-sectional view of an embodiment of the working electrode and sample inlet and outlet according to the present invention;

FIG. 7 is a cross-sectional view of a modification of the embodiment of FIG. 6; and FIG. 8 is a cross-sectional view of a diaphragm according to the present invention.

Figure 1:
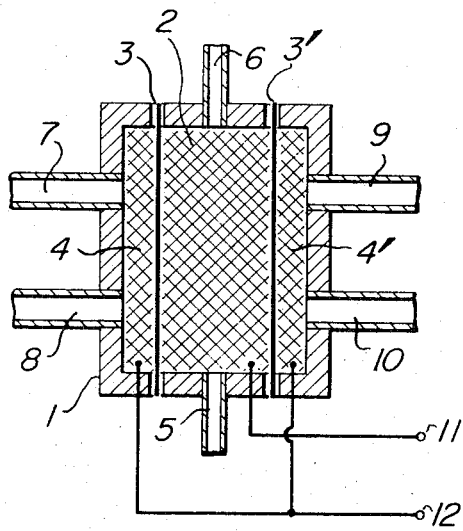
FIG. 1 is a cross-sectional view of a detector cell for coulometric analysis according to the present invention.

Referring now to FIG. 1 which shows the fundamental structure of a detector cell for coulometric analysis according to the present invention, the cell for coulometric analysis comprises a vessel 1 made of an electrical insulator. The vessel 1 contains therein a working electrode 2 made of, for example, metallic wire netting, carbon cloth or the like, diaphragms 3 and 3' made of, for example, ion-exchange membrane or the like, and counterelectrodes 4 and 4' made of, for example, metallic wire netting, carbon cloth or the like. On the one side of the working electrode 2 is disposed the counterelectrode 4 with the diaphragm 3 interposed therebetween, and on the other side of the working electrode 2 is disposed the counterelectrode 4' with the diaphragm 3' interposed therebetween. In other words, the working electrode 2 is interposed between the counterelectrodes 4 and 4' through the diaphragms 3 and 3'. The vessel 1 is provided with a sample inlet 5 and a sample outlet 6 at its lower center and upper center, respectively. A sample to be analyzed is introduced into the working electrode 2 through the sample inlet 5, and exhausted through the sample outlet 6. The vessel 1 is further provided with ports 7, 8 and 9, 10 on its left side and right side, respectively. The ports 8 and 9 are connected with each other by means of a not shown connecting conduit. An electrolyte solution is led from the port 7 through the counterelectrode 4 to the ports 8 and 9 and then exhausted from the port 10 through the counterelectrode 4'. Electric lead wires 11 and 12 are connected with the working electrode 2 and the counterelectrodes 4 and 4', respectively.

When a required voltage is applied between the working electrode 2 and the counterelectrodes 4 and 4' in the state that the vessel 1 is filled with an electrolyte solution, an object material in a sample to be analyzed is electrolyzed while the sample is being led from the sample inlet 5 through the working electrode 2 to the sample outlet 6.

Figure 2:
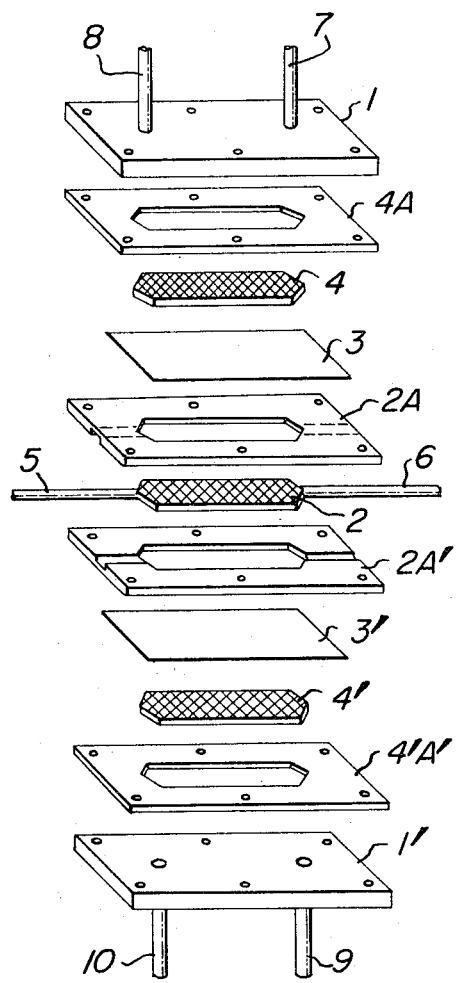
FIG. 2 is an exploded view of a detector cell for coulometric analysis according to the present invention.

FIG. 2 is an exploded view of a detector cell for coulometric analysis according to the present invention fundamentally the same as that of FIG. 1. Each of keep plates 1 and 1' is made of a plate of synthetic resin, for example, polyvinyl chloride having an area of about 90 x 40 mm.² and a thickness of several millimeters. These keep plates 1 and 1' are provided with tubes 7, 8 and 9, 10, respectively, of electric insulator, for example, vinyl chloride having an inner diameter of, for example, 2 mm. for intaking and exhausting an electrolyte, for example, an NaCl solution. Counter electrodes 4 and 4' are made of metallic wire netting of about 40 to 200 mesh, for example, silver wire netting and have a configuration as illustrated. Electric insulator plates 4A and 4'A' are made of, for example, silicone rubber and have openings at their centers of the same shape as the counterelectrodes 4 and 4' into which the electrodes 4 and 4' are fitted, respectively, when assembled. In this embodiment each of the plates 4A and 4'A' has the same area as that of the keep plates, i.e. an area of 90 x 40 mm.² and a thickness of about 1 mm. A working electrode 2 may be made of platinum wire netting, silver wire netting, carbon cloth, or the like as required and has the same shape as that of the counterelectrodes 4 and 4'. The working electrode 2 is provided with electrically insulating tubes 5 and 6, for example, Teflon tubes having an inner diameter of 1 mm. for intaking and exhausting a sample solution. The working electrode 2 is fitted, when assembled, into openings of the same configuration as that of the working electrode 2 formed in electrically insulating plates 2A and 2A', for example, silicone rubber plates similarly to the insulator plates 4A and 4'A'. The area of the plates 2A and 2A' is the same as that of the keep plates 1 and 1', i.e. 90 x 40 mm.² and the thickness thereof is about 2 mm. The insulator plates 2A and 2A' have grooves at the positions corresponding to the disposition of the sample inlet and outlet tubes 5 and 6. Diaphragms 3 and 3' disposed between the insulator plates 4A and 2A and between the insulator plates 4'A' and 2A', respectively, permit particular ions in an electrolyte solution to pass therethrough, but prevent an object material and electrolysis products at the counter electrodes 4 and 4' from passing therethrough. In order to make the resistance of the cell low the diaphragm should be such that ions in the electrolyte solution can easily pass through the diaphragm and the thickness thereof is as small as possible leading to a large quantity of passed ions per unit area. For this purpose ion-exchange membranes are used for the diaphragms 3 and 3'. The size of the diaphragms 3 and 3' is smaller than 90 x 40 mm.².

Figure 3:
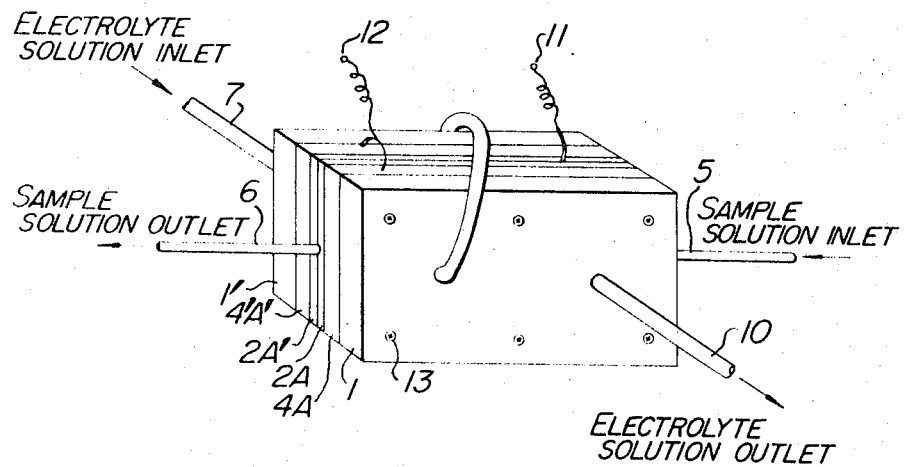
FIG. 3 is a perspective view of the detector cell obtained by assembling the members in FIG. 2.

FIG. 3 is a perspective view of the cell resulted from assembling the structural components in FIG. 2. The insulator plates 2A and 2A', the insulator plates 4A and 4'A', and the keep plates 1 and 1' are arranged from the center to the outer sides and bound with clamping bolts 13 into a liquid-tight vessel. Lead wires 11 and 12 connected with the working electrode 2 and the counterelectrodes 4 and 4', respectively, serve as measurement terminals at the time of electrolysis.

To effect controlled potential coulometry, a potentiostat (voltage source for controlled potential electrolysis) and a coulometer are necessary. However, for an electrolytic cell prepared for liquid chromatography it is possible to effect controlled potential electrolysis by employing a source of substantially constant voltage of the order of 0 to ±3 volts having a low impedance. FIG. 4 shows an example of the circuit of an automatic coulometer employing a modern electronic technique.

The circuit of FIG. 4 employs an operational amplifier as an integrator and suitable for measuring a microquantity of electricity. This circuit is also superior in easiness of handling and stability. The output voltage $e_o$ of this circuit directly represent the quantity of electricity:

$$e_o = \frac{R_L}{R_C} \int i\, dt = \frac{R_L}{R_C} \cdot Q$$

The output is read by a potentiometer or digital voltmeter. For liquid chromatograph automatic recording is possible by individually or simultaneously recording the voltage across the resistance $R_L$ on the input side and the output voltage $e_o$ of the integrator.

In order to detect an object material in a sample solution by means of controlled potential coulometry it is desirable to be able to obtain a current efficiency and electrolysis rate of 100%. In other words, it is desirable that the object material is electrolyzed in its entirety while it is lead from the inlet to the outlet. FIG. 5 shows the relationship between the flow rate of a sample and the electrolysis rate for an electrolytic cell inferred from the quantity of dissolved oxygen in the sample. The graph of FIG. 5 is shown for mesh numbers of from 40 mesh to 200 mesh of the working electrode as a parameter. It can be seen from the graph of FIG. 5 that the sample is completely electrolyzed with respect to oxygen at the flow rate of 4 ml./min. or less for a 80 mesh working electrode and at the flow rate of 1 ml./min. or less for a 40 mesh working electrode. However, since these limits of the flow rate are of course affected by the mesh number of the counterelectrodes, the volume of the electrolytic cell and the like, it is to be noted that the above values express rough orders of magnitude. As the wire netting of the electrode, the larger the mesh number of the wire netting is, the more suitable it is for the electrolytic cell. However, 200 mesh or more wire netting is not only difficult in working and expensive, but apt to get clogged by deposits or impurities. Consequently, as the working electrode for the electrolytic cell for flow type coulometry 40 to 200 mesh metallic wire netting is suitable for cells having a volume similar to that of the above-mentioned example.

When the tips of the tubes 5 and 6 for intaking and exhausting the sample directly touches the working electrode 2 and when deposits are there in the sample solution, the cell will soon get clogged. Therefore, if suitable spaces are provided between the tips of the tubes 5 and 6 and the working electrode 2 as shown in FIGS. 6 and 7, the above-mentioned disadvantage can almost be obviated. In these figures the working electrode 2 is shown as being composed of three working electrode units 2', 2'' and 2'''.

Although it is desirable for reducing the cell resistance to employ an ion-exchange membrane as the diaphragm as has been stated above, it is practically very difficult to set up the cell so that the solution does not leak at the part of the ion-exchange membrane. The solution leak becomes a cause of noise. Such being the case, the periphery of cloth 3A an 3B disposed on both sides of the diaphragm 3, 3' is impregnated with chemicals proof, adhesive, and suitably elastic electric insulator such as silicone rubber to integrate the cloth 3A and 3B and the diaphragm 3, 3' into units. Then, the assembly of the cell is very easy, and the solution leak is prevented. Furthermore, since the cloth 3A and 3B covers the diaphragm 3, 3', the diaphragm does not directly contact the counterelectrodes 4 and 4', resulting in a longer life time. In FIG. 8 reference numeral 15 designates the insulator layer such as silicone rubber.

The present invention as has been described above with reference to the preferred embodiments has the following advantages:

(1) Since the flat working electrode is interposed between the counterelectrodes through the diaphragms, the electrode area can be made larger for a smaller cell volume the conventional one. Consequently, the electrolysis velocity is high and the response is very rapid.

(2) For the same reason as above, even if the cell volume is made small and the electrode area is made large, the potential distribution in the cell is uniform.

(3) Again for the same reason as above, the cell volume can be made small, and hence the quantity of the sample is small and the cell resistance is low.

(4) The structure is very simple and compact.

(5) Since suitable spaces are provided between the working electrode and the tubes for intaking and exhausting the sample, noise is hardly generated and the cell does not get clogged even if there exist deposits in the sample.

(6) Since the diaphragm is interposed between sheets of cloth and integrated into a unit therewith by means of suitably elastic and adhesive electric insulator, the solution leak as well as the direct contact of the diaphragm to the electrodes is prevented.

(7) Since an ion-exchange membrane is used for the diaphragm, the cell resistance is reduced the more.

What we claim is:

1. A detector cell for coulometric analysis of a sample liquid flowing therethrough using controlled potential coulometry, said cell comprising a vessel to be filled with an electrolyte solution, a working electrode arranged in said vessel, said working electrode being porous to allow passage of a sample liquid therethrough and having a plate-like shape, a pair of counterelectrodes each disposed in said vessel on each side of said working electrode, ion exchange membranes for preventing passage of said sample liquid and for allowing passage of ions from said electrolyte solution interposed between each of said counterelectrodes and said working electrode, said counterelectrodes also being porous to allow passage of said electrolyte solution therethrough and each of said ion exchange membranes being in contact with said working electrode and one of said counterelectrodes in such a way that there is substantially no space left between said electrodes and said membrane, sample inlet and outlet means provided in said vessel for leading the sample liquid to and away from said working electrode, electrolyte solution inlet and outlet means disposed in said vessel so that said electrolyte solution is passed through said counterelectrodes and means electrically connected to said counterelectrodes and to said working electrode for applying a constant voltage between said working electrode and said pair of counterelectrodes thereby electrolyzing said sample liquid, and means for measuring through said working electrode and said counterelectrodes the quantity of electricity caused by the electrolyzation of said sample liquid.

2. The detector cell of claim 1, wherein the working electrode and the counterelectrodes are made of metallic wire netting or carbon cloth.

3. The detector cell of claim 2, wherein said metallic wire netting has a mesh from 40 to 200.

4. The detector cell of claim 1, wherein a cloth layer is disposed on each side of said ion-exchange membrane, each layer being integral with said membrane.

5. The detector cell of claim 4, wherein said cloth layers are connected along the peripheral portions thereof by a silicon rubber adhesive impregnated in the cloth at said peripheral portions.

6. The detector cell of claim 1, wherein said sample inlet and outlet means are opposed to said working electrode so that spaces are provided between said working electrode and said sample inlet and outlet means, respectively, whereby clogging of said cell by deposits from the sample liquid are prevented.

7. The detector cell of claim 1, wherein said working electrode substantially fills the space defined by said vessel between said ion-exchange membranes, and further wherein said counterelectrodes substantially fill the spaces between respective ion-exchange membranes and respective vessel walls.

8. A detector cell for coulometric analysis of a sample liquid flowing therethrough by controlled coulometry, said liquid sample being obtained from liquid chromotography, which comprises a vessel adapted to contain an electrolyte solution; a plate-like working electrode disposed in said vessel, said electrode being made of metallic wire netting to allow passage of a sample liquid therethrough; diaphragm assemblies disposed on each side of said working electrode for preventing passage of said sample liquid and for allowing passage of ions from said electrolyte solution, said diaphragm assemblies being in contact with the working electrode such that substantially no space is maintained between the working electrode and the respective diaphragm assemblies, each of said diaphragm assemblies comprising an ion-exchange membrane and cloth disposed on both sides thereof, said ion-exchange membrane and said cloth being integrated into a unit by silicon rubber impregnated into said cloth at the periphery thereof; counterelectrodes each disposed on the side of each of said diaphragm assemblies opposite to said working electrode, said counterelectrodes being in contact with said diaphragm assemblies such that substantially no space is maintained between the counterelectrodes and respective diaphragm assemblies, said counterelectrodes being made of a metallic wire netting to allow passage of said electrolyte solution therethrough; electrolyte solution inlet and outlet means provided on said vessel for passing an electrolyte solution through said counterelectrodes; sample inlet and outlet means provided on said vessel and arranged so that spaces are provided between said working electrodes and said sample inlet and outlet means, respectively, for leading the sample liquid to be analyzed to and away from said working electrodes, and means electrically connected to said counterelectrodes and to said working electrode for applying a constant voltage between said working electrode and said pair of counterelectrodes.

9. The detector cell of claim 8, wherein said metallic wire netting has a mesh of from 40 to 200.

10. The detector cell of claim 8, wherein the shape of the counterelectrode and working electrode are the same.

11. The detector cell of claim 8, wherein the working electrode substantially fills the space in said vessel defined between said diaphragm assemblies, and further wherein the counterelectrodes substantially fill the spaces in said vessel between respective counterelectrodes and respective vessel walls.

References Cited

UNITED STATES PATENTS

| | | | |
|---|---|---|---|
| 2,794,777 | 6/1957 | Pearson | 204—296 XR |
| 3,072,545 | 1/1963 | Juda et al. | 204—263 XR |
| 3,496,091 | 2/1970 | McGriff et al. | 204—301 |

FOREIGN PATENTS

| | | | |
|---|---|---|---|
| 1,100,604 | 3/1961 | Germany | 204—295 |

GERALD L. KAPLAN, Primary Examiner

U.S. Cl. X.R.

204—263, 295